United States Patent
Beuchle et al.

(10) Patent No.: US 8,226,763 B2
(45) Date of Patent: *Jul. 24, 2012

(54) SINGLE-PHASE HYDRAULIC BINDER, METHODS FOR THE PRODUCTION THEREOF AND STRUCTURAL MATERIAL PRODUCED THEREWITH

(75) Inventors: Guenter Beuchle, Karlsruhe (DE); Peter Stemmermann, Karlsruhe (DE); Uwe Schweike, Karlsruhe (DE); Krassimir Garbev, Eggenstein-Leopoldshafen (DE)

(73) Assignee: Karlsruher Institut Fuer Technologie, Karlsruhe (DE)

( * ) Notice: Subject to any disclaimer, the term of this patent is extended or adjusted under 35 U.S.C. 154(b) by 291 days.

This patent is subject to a terminal disclaimer.

(21) Appl. No.: 12/670,104

(22) PCT Filed: Jul. 16, 2008

(86) PCT No.: PCT/EP2008/005785
§ 371 (c)(1), (2), (4) Date: Jan. 21, 2010

(87) PCT Pub. No.: WO2009/015770
PCT Pub. Date: Feb. 5, 2009

(65) Prior Publication Data
US 2010/0186634 A1  Jul. 29, 2010

(30) Foreign Application Priority Data
Jul. 27, 2007 (DE) ......................... 10 2007 035 259

(51) Int. Cl.
*C04B 12/00* (2006.01)
(52) U.S. Cl. ...................................... 106/713; 106/724
(58) Field of Classification Search .................. 106/713, 106/724
See application file for complete search history.

(56) References Cited

U.S. PATENT DOCUMENTS

| | | | |
|---|---|---|---|
| 3,066,031 | A | 11/1962 | Schifferle |
| 4,217,143 | A | 8/1980 | Reich et al. |
| 4,605,443 | A | 8/1986 | MacDowell |
| 5,804,175 | A | 9/1998 | Ronin |
| 2004/0089203 | A1 | 5/2004 | Ronin |
| 2010/0206199 | A1* | 8/2010 | Beuchle et al. ............... 106/801 |
| 2011/0041737 | A1* | 2/2011 | Beuchle et al. ............... 106/739 |

FOREIGN PATENT DOCUMENTS

| | | |
|---|---|---|
| DE | 2 222 545 | 11/1972 |
| DE | 195 48 645 A1 | 6/1997 |
| DE | 10 2005 037 771 A1 | 2/2007 |
| EP | 0 470 948 | 2/1992 |
| EP | 0 500 840 B1 | 3/1999 |
| WO | WO 91/06513 A | 5/1991 |
| WO | WO 2007/017142 A | 2/2007 |
| WO | WO 2007/017142 A2 | 2/2007 |

OTHER PUBLICATIONS

Sun et al., "29 Si NMR Study of the Hydration of Ca3SiO5 and beta-Ca2SiO4 in the Presence of Silica Fume", Journal of the American Ceramic Society, vol. 82, No. 11, 1999, pp. 3225-3230.
Garbev et al., "Structural Features of C-S-H (I) and its Carbonation in Air-A Raman Spectroscopic Study, Part 1: Fresh Phases", Journal of the American Ceramic Society, vol. 90, No. 3, Mar. 2007, pp. 900-907.
Sun et al., "Silicon Substitution for Aluminium in calcium Silicate Hydrates", Joournal of the American Ceramic Society, vol. 82 No. 5, 1999, pp. 1307-1322.
Friedrich Wilhelm Locher: "Cement Principles of Production and Use", 2006, Verlag Bau+Technik GmbH, Duesseldorf, p. 354-356.

* cited by examiner

*Primary Examiner* — Paul Marcantoni
(74) *Attorney, Agent, or Firm* — Muncy, Geissler, Olds & Lowe, PLLC

(57) ABSTRACT

The invention relates to a monophase hydraulic binder containing silicon, calcium, oxygen and hydrogen atoms in an arrangement comprising silicate building units having an average connectedness of no more than $Q^{1.5}$ and silanol groups, with none or a part of the calcium atoms being substituted for by a metal atom $M[6]^{x+}$ sixfold or higher-coordinated with oxygen and/or none or a part of the silicon atoms being substituted for by a metal atom $M[4]^{y+}$ tetrahedrally coordinated with oxygen, the molar ratio of $$[CaO+(x/2)\cdot(M[6]^{x+}O_{x/2})]:[SiO_2+M[4]^{y+}O_{y/2}]$$

having a value of 0.75 to 2.75, and the binder containing an $H_2O$ content of 3.5% by weight to 20% by weight, as well as a mixture containing this binder.
Furthermore, the invention relates to methods for manufacturing the binder or a mixture containing this binder by converting calcium-containing and silicate-containing starting materials into a preproduct which at least in part contains a calcium hydroxosilicate, subsequent grinding of the calcium hydroxosilicate until the monophase hydraulic binder forms, and optionally drying the monophase hydraulic binder to an $H_2O$ content of 3.5% by weight to 20% by weight.
Finally, the invention relates to a building material made by setting the binder or a mixture containing this binder with water and subsequent hardening.

15 Claims, No Drawings

SINGLE-PHASE HYDRAULIC BINDER, METHODS FOR THE PRODUCTION THEREOF AND STRUCTURAL MATERIAL PRODUCED THEREWITH

This application is a national stage of International Application No.: PCT/EP2008/005785, which was filed on Jul. 16, 2008, and which claims priority to German Patent Application No.: 10 2007 035 259.1, which was filed in Germany on Jul. 27, 2007, and which are both herein incorporated by reference.

The invention relates to a monophase hydraulic binder, a mixture containing such binder, a method for manufacturing the binder and the mixture as well as a building material manufactured with the binder or the mixture.

Hydraulic reactivity describes the reaction of a binder with water so that a solid material is formed. The definition of this process is made on the basis of the conventionally known hydraulic binders, such as Portland cement. According to Härig, Gunther, in Klausen, *Technologie der Baustoffe [Technology of Building Materials]*, C. F. Müller Verlag, Heidelberg, 1996, p. 53, hydraulic binders harden in air as well as under water after water has been added. According to H. F. W. Taylor, *The chemistry of cements*, Academic Press, London 1964, p. 2 et seq., cement is a hydraulic binder which, mixed with water to a paste (cement paste), independently starts to stiffen and hardens into cement stone due to chemical reactions between the water and the compounds present in the cement. In this process, the stiffening and hardening depend neither on drying nor on reactions with the $CO_2$ from the air. Therefore, the reaction takes place in the air as well as under water.

Moreover, latent hydraulic binders (so-called pozzolanic binders) are known. According to Härig (see above) they harden only in the presence of an activator after water has been added. In order to start the setting reaction, e.g. lime hydrate or Portland cement are added; however, there will be no independent reaction.

Conventionally known hydraulic binders based on silicates do not contain any molecular water, their hydraulic components contain no hydrogen in their summation formula, and the hydraulic components for the most part consist of crystalline alkali (earth) silicates. According to H. F. W. Taylor, *The chemistry of cements*, Academic Press, London 1964, p. 2 et seq., the silicate ions of the hydraulically active phases are present in the form of single isolated or monomeric silicate tetrahedra ($Q^0$). An exception is the rare phase belinite, which is a cyclosilicate and contains chlorine. In belinite, each silicate tetrahedron is linked with two further silicate tetrahedra ($Q^2$) via common oxygens. All conventionally known hydraulic binders based on silicates contain a molar ratio of $CaO:SiO_2$ of at least two.

Such hydraulic binders are used purely or mixed with other materials as cement in various ways for manufacturing solid building materials such as concrete, mortar or in special binders. Moreover, two further types of mostly higher condensed silicate and amorphous (but not hydraulic) binders are of technical importance, namely water glasses on the one hand and latent hydraulic or pozzolana materials, such as blast-furnace slags, fly ashes, etc., on the other hand.

1. Cement is manufactured by burning calcium carbonate and a silicate carrier at approximately 1,450° C. together to a product which is called (cement) clinker and substantially consists of the hydraulically reactive clinker phases tricalcium silicate (alite, $Ca_3SiO_5$), dicalcium silicate (belite, particularly β-$Ca_2SiO_4$) and on a subordinate level tricalcium aluminate $Ca_3Al_2O_6$ and calcium aluminate ferrite $Ca_4(Al,Fe)_4O_{10}$. By grinding and adding further materials, particularly gypsum or anhydrite as reaction retarders, so-called Portland cement (CEM I) is obtained. CEM I is often ground with latent hydraulic silicates to the cement types CEM II to CEM V. The grinding produces a higher surface which accelerates the speed of the hydraulic reaction. According to DIN 1164, Portland cement consists of 61% to 69% of calcium oxide CaO, 18% to 24% of silicon dioxide $SiO_2$, 4% to 8% aluminum oxide of $Al_2O_3$ and 1% to 4% iron oxide of $Fe_2O_3$.

2. Furthermore, so-called water glasses are manufactured. These are solid, but water-soluble glasses made from alkali oxides and $SiO_2$, which are melted at approximately 1,400° C. Water glasses are used as concentrated, strongly alkaline solutions or powders.

3. Moreover, silicate starting materials can be caused to react with a lye to a binder by reaction, with alkali hydroxides being used as lyes. The resulting product is mostly called a geopolymer, however, it is only of small economic importance.

Types 2 and 3, water glasses and geopolymers, are to be regarded as hydraulic binders only to a limited degree in the sense of the definitions mentioned at the beginning as they either already exist as solutions, that is, not solid, and do not harden, respectively, under water due to their high water solubility (alkali silicates) or are not reactive as solid materials and need additives such as CEM I or lye to set the hydraulic reaction in motion. Their manufacture requires both particular starting materials and respectively several laborious procedural steps which make their manufacture expensive. At the same time, their compatibility with various additives is extremely limited due to the very high pH values and it is not possible to effectively influence the reaction speed, which commonly is very slow, in particular, it is not possible to accelerate it. Due to the limited processability (slow hardening, strongly alkaline reaction) and the low strength their range of application is limited.

The hydraulic binder which is best known and used most often is cement, in particular Portland cement. According to H. F. W. Taylor, *Cement chemistry*, Academic Press, London 1990, p. 64 et seq., the burning process required for the manufacture of the preproduct cement clinker at temperatures of up to about 1,450° C. with a theoretical reaction enthalpy of +1,761 kJ per kg of cement clinker uses especially much energy. The lion's share of the required energy is taken up by the calcination (or decarbonation) of calcium carbonate originating from limestone, calcareous clay or other calcareous materials. The reaction releases $CO_2$ and contributes to the overall reaction in a strongly endothermic manner with a enthalpy of reaction of +2,138 kJ per kg of cement clinker.

About 1.2 kg of lime are needed to manufacture 1 kg of Portland cement. Additionally, in order to create the hydraulically active clinker phases alite, belite, tricalcium aluminate and calcium aluminate ferrite it is necessary to partly melt the starting materials. As a sum of the theoretically required energy, the heat losses, the grinding energy, etc. an actual overall energy consumption of about +4,300 kJ per kg is the result for the end product Portland cement.

During the manufacture of Portland cement, considerable amounts of $CO_2$ are released from the calcium carbonate containing materials, which in total add up to about 850 g of $CO_2$ per kg of clinker.

The reaction of Portland cement with water leads to solidification (hardening). According to H. F. W. Taylor, *Cement chemistry*, Academic Press, London 1990, p. 218, C—S—H gels, that is, poorly crystalline calcium silicate hydrates, as well as calcium aluminate hydrates and portlandite $Ca(OH)_2$ are produced. The latter is a necessary consequence of the setting reaction and occurs at a proportion of about 20% by weight in the set, i.e., hardened cement stone.

It is not possible to substantially lower the overall content of calcium in Portland cement in general and particularly in the preproduct clinker because otherwise the hydraulic reactivity will strongly decrease. The overall content of calcium expressed as a molar ratio of Ca:Si which incidentally is identical to the molar ratio of $(CaO):(SiO_2)$ is always at 3.0+/−0.2. The binder matrix of C—S—H gel present in the cement stone made from Portland cement, which substantially results from the reaction of tricalcium silicate $Ca_3SiO_5$, has a molar ratio of Ca:Si of 1.7 to 1.8. The excess CaO is present as portlandite $Ca(OH)_2$ after the hydration.

Portlandite contributes to the mechanical stability of the building material only to a minor degree. Rather, portlandite determines the pH value of the building material during service life of the cements, which will then be about pH 12.5. Acid attacks are buffered by portlandite at first; however, once it has been consumed, for example, by having been transformed into $CaCO_3$ by $CO_2$, the pH value will decrease and the binder matrix made of C—S—H gel will be attacked and decomposed.

It is possible to inhibit the reaction by creating a structure as dense as possible and thus slow down the material transport. However, the dissolution of portlandite itself will generate new opportunities for attack. The buffering of the pH value in cement by portlandite thus represents a limited corrosion protection for constructional steel. In contrast thereto, the high alkalinity generated by portlandite prevents the use of base or alkali-sensitive additives in cement-bonded building materials, such as organic fibres. A pH value of higher then 9.5 would suffice for corrosion protection.

Portland cement releases a high enthalpy of reaction when it sets, which substantially results from the formation of portlandite and leads to heat accumulations in large, massive or voluminous building elements. The temperature build-up per unit of time may be decreased by decelerating the reaction rate by means of grain enlargement, additive agents or dilution with fly ashes. However, this also slows down the strength development.

The strength of cement stone is determined by the main component C—S—H gel which is only about 50% by weight. Therefore, the effective energy consumption for manufacturing the strength-determining constituents of cement stone made from Portland cement is approximately 8,600 kJ per kg. The other half of the cement stone, essentially calcium aluminate hydrates and portlandite, hardly contributes to the strength of the material or building material, and with regard to strength it is an undesired by-product. The amount of portlandite may be reduced subsequently in technical systems by admixing micro-silica or latent hydraulic substances. Excess portlandite will then slowly react to additional calcium silicate hydrates by consuming micro-silica. However, this process is laborious and expensive.

Moreover, C—S—H gels may incorporate various amounts of calcium. When the calcium content increases, the connectedness of the associated silicate building units will decrease and so will their contribution to the strength of the building material as well as their chemical stability. In set Portland cement stone the C—S—H gels are present with a molar ratio of Ca:Si of 1.7 to 1.8. In contrast to that, calcium silicate hydrates exist in a range of the molar ratio of Ca:Si of 0.5 to 3.0. This is proven by naturally occurring or synthetically produced solid materials.

Due to the reasons as mentioned it would make sense to aim at C—S—H gels having a low calcium content in a hardened hydraulic binder in general and in cement stone made from Portland cement in particular. However, a slight reduction of the calcium content during the production of Portland cement clinker in a rotary kiln already results in less reactive calcium silicates and to an increase in the content of belite in particular. A further decrease of the calcium content leads to hydraulically inactive products such as wollastonite $\beta$-$CaSiO_3$, pseudowollastonite $\alpha$-$CaSiO_3$ or rankinite $Ca_3Si_2O_7$. In this manner, that is, on a "clinker route", it is not possible to obtain hydraulic binders low in calcium.

In the system of CaO—$SiO_2$—$H_2O$ there are pure calcium silicate hydrates having molar ratios of Ca:Si which are smaller than 2.0 and in particular smaller than or equal to 1.0. Naturally occurring minerals, such as tobermorite-11 Å, tobermorite-14 Å, xonotlite, $\alpha$-$C_2SH$, or suolunite [according to Young-Hwei Huang, *Suolunite, a new mineral*, American Mineralogist 53 (1968), p. 349] as well as synthetic products are known. Due to their molar ratio of Ca:Si these compounds have a silicate connectedness between $Q^0$ and $Q^3$ and in some cases contain silanol groups, however, no hydraulic activity or latent hydraulic behaviour is known from any of these phases.

Moreover, there are compounds in which the calcium ions are partly substituted for: $M^{(+II)}H_xM^{(+I)}{}_{(2-x)}[SiO_4]$, with $M^{(+II)}$=alkaline earth metal and $M^{(+I)}$=alkali metal. In this case similar molar ratios of Ca:Si and thus a similar connectedness as in the above-mentioned pure calcium silicate hydrates also occur and so do silanol groups again in some cases. No hydraulic reaction or latent hydraulic behaviour is known either from any of these phases.

DE 10 2005 037 771 A1 discloses a method for manufacturing belite binders, wherein a starting material having calcium oxide and silicon dioxide in a molar ratio of Ca:Si between 2.5:1 and 1.5:1 is mixed with seed crystals from $\alpha$-dicalcium silicate hydrate, $\alpha$-$C_2SH$. The starting material thus modified is then hydrothermally treated at a temperature between 100 and 300° C. whereby it mainly converts into the intermediate product $\alpha$-$C_2SH$. After drying the intermediate product at a temperature between 500° C. and 1,000° C. and subsequent cooling the desired belite binder will deposit.

WO 2007/017142 A2 discloses a method for manufacturing belite binders. Belite does not contain any hydrogen bonded to oxygen and has a connectedness of $Q^0$.

DE 22 22 545 B2 discloses a method for manufacturing a calcium silicate of the xonotlite type containing hydrogen bonded to oxygen, the xonotlite being crystalline. Due to the hydrothermal manufacture the amorphous preproduct described in this patent is a hydrate which does not harden hydraulically.

EP 0 500 840 B1 discloses tectoalumo silicate cement as well as an appropriate manufacturing method, the tectoalumo silicate having a connectedness of $Q^4$. Moreover, the hydraulic hardening of corresponding compounds is not based on the formation of C—S—H phases.

According to DE 195 48 645 A1, which describes a method for manufacturing secondary raw materials from demolition material, concrete demolition material is activated by grinding. However, the grinding is made such that no hydraulic product is formed, but a product which may be used as a cement raw mix constituent. If concrete demolition material is used the starting component moreover contains a sulfate carrier which as a reaction product should prevent the manufacture of a monophase product.

Starting therefrom, it is the object of the present invention to propose a monophase hydraulic binder, a mixture containing such binder, methods for the manufacture of the building material and the mixture as well as a building material which has been produced with the binder or the mixture, which do not have the aforementioned drawbacks and limitations.

In particular, a monophase hydraulic binder based on silicate and a mixture containing this binder are to be provided, which, as compared to conventional Portland cement and to hydraulic or latent hydraulic binders, respectively,

- lowers the energy consumption during the manufacture of the binder, i.e. which is manufactured at low temperatures,
- lowers the amount of the $CO_2$ emissions,
- shows a lower total release or a more uniform release of heat during hydration, and
- achieves higher durability and strength of building materials and materials, respectively, made using this binder.

This object is achieved by the features of claim 1 with regard to the monophase hydraulic binder, by the feature of claim 6 with regard to the mixture, by the features of any one of claim 8 or 9 with regard to the manufacturing method and by the features of claim 14 with regard to the building material. The subclaims each describe advantageous embodiments of the invention.

The inventive hydraulic binder is a hydraulically active silicate compound containing calcium, silicon, oxygen and hydrogen. Other elements may also be constituents of the binder and are distinguished according to the type of their incorporation: alkali metals, in particular sodium; alkaline earth metals, in particular magnesium, or other divalent cations, in particular Fe[+II] and manganese; trivalent cations, in particular Al[+III], are incorporated as $M[6]^{x+}$ sixfold or higher coordinated with oxygen, with the $M[6]^{x+}$ partly substituting for the calcium. Elements tetrahedrally coordinated by oxygen, in particular phosphorous, aluminum or $Fe^{3+}$, form oxygen anions and are incorporated as phosphate, aluminate or ferrate on tetrahedral positions as $M[4]^{y+}$, partly substituting for silicon. The amphoteric aluminum is suitable for both variants, just like magnesium. The exponents x+ and y+ respectively indicate the charge of the relevant cation.

The stoichiometry of the inventive hydraulic binder is defined by a molar ratio of Ca:Si of between 0.75 to 2.75, particularly preferable of 1.0 to below 2.0. In case that a part of the calcium or silicon atoms is replaced by the substituents $M[6]^{x+}O_{x/x}$ and $M[4]^{y+}O_{y/2}$, respectively, the modified molar ratio $[CaO+(x/2)\cdot(M[6]^{x+}O_{x/2})]:[SiO_2+M[4]^{y+}O_{y/2}]$ will be indicated instead of the simple molar ratio of Ca:Si, which is identical to the molar ratio of $(CaO):(SiO_2)$.

The inventive monophase hydraulic binder is characterized by a low average connectedness of the silicate building units of $Q^{1.5}$ or less. This value indicates the occurrence of low molecular silicate building units, i.e. from monomers to trimers (e.g. dimers in suolunite or trimers in rosenhahnite), with monomeric silicate building units, which are also referred to as island silicates or as $Q^0$ units, being particularly preferred. A further characteristic of the inventive monophase binder is the formation of silanol groups which may form weak hydrogen bridges.

The silicate building units are determined by gas chromatography after trimethyl silylation. The inventive monophase hydraulic binder is X-ray amorphous.

The present invention relates to a monophase hydraulic binder consisting of hydraulically active calcium silicate. In comparison to Portland cement this binder contains less calcium and fewer calcium-substituting elements, respectively, such that the molar ratio of $[CaO+(x/2)\cdot(M[6]^{x+}O_{x/2})]:[SiO_2+M[4]^{y+}O_{y/2}]$ is lower. The inventive monophase hydraulic binder may be manufactured qualitatively from the same starting materials as Portland cement, which, however, are used in amounts different therefrom. Moreover, the manufacturing process requires lower temperatures, which means that energy consumption and carbon dioxide emissions will be reduced.

Furthermore, the present invention relates to a mixture comprising a proportion of the inventive monophase hydraulic binder. Preferably, the proportion is at least 10% by weight, particularly preferably at least 25% by weight, above all preferably at least 50% by weight.

As is known from Portland cement, the setting and also the hardening are carried out by mixing with water and optionally take place under water. The hydration creates a mechanically solid building material. The hydraulic reaction of the inventive hydraulic binder does not produce portlandite $Ca(OH)_2$, at no time can it be detected by X-ray diffraction. Moreover, the setting reaction proceeds with lesser release of heat than during the hydration of Portland cement. As already known in the case of Portland cement, the setting speed can be adjusted in a wide range by substituting various elements, varying the processing (e.g. grinding) as well as by surface-active additives, such as organic additives. The maximum of the heat of hydration will then be reached after a period of time of several minutes or only after several days.

During setting the inventive hydraulic binder reacts to a calcium silicate hydrate (C—S—H phase) having a molar ratio of Ca:Si of less than 1.5. In this process the connectedness of the silicate building units changes by polymerization on the molecular level, a solidification takes place on the macroscopic level.

Depending on the composition of the starting material, the hydration product may optionally inclose further alkali metals, alkaline earth metals or other elements such that a calcium silicate hydrate having a modified molar ratio of $[CaO+(x/2)\cdot(M[6]^{x+}O_{x/2})]:[SiO_2+M[4]^{y+}O_{y/2}]$ of smaller than 1.5 is generated. In contrast thereto, set Portland cement consists of a C—S—H gel (cement gel) having a molar ratio of Ca:Si of 1.7 to 1.8 and additionally contains portlandite $Ca(OH)_2$.

The building material manufactured by the setting reaction according to the invention is chemically more stable than Portland cement stone due to the absence of portlandite and due to the lower molar ratio of Ca:Si as compared to cement stone made from Portland cement. The compressive strength measured after 28 days exceeds 20 N/mm². This value is within the order of magnitude of the European standard EN 197 for cements indicating 3 different classes for strength of 32.5, 42.5, and 52.5 N/mm².

If the inventive binder contains less than 1% of $Na_2O$, it may be reacted to an inventive building material, together with alkali-sensitive additives, such as inorganic or organic fibres with low alkali durability.

The manufacture of the inventive silicate hydraulic binder is made in a two-step process.

In a first step (a) a mixture of solid starting materials with or without water is converted into a calcium hydroxosilicate. This mixture contains calcium, silicon, oxygen and hydrogen. Silicon is present in the calcium hydroxosilicate in the form of low molecular silicate building units having silanol groups. Low molecular silicate building units, namely monomers carrying silanol groups, are particularly preferred. The conversion is made by supplying mechanical, thermal or chemical energy.

The calcium hydroxosilicate manufactured in step (a) is stabilized by a system of hydrogen bonds. Table 1 shows a compilation of conventionally known calcium hydroxosilicates which in part contain crystal water and are suitable for manufacturing the inventive monophase hydraulic binder.

TABLE 1

| | |
|---|---|
| $Ca_{1.5}[SiO_3(OH)] \cdot 0.5(Ca(OH)_2)$ | $\alpha$-$C_2SH$ |
| $Ca_{1.5}[SiO_3(OH)] \cdot 0.5CaF$ | |
| $Ca_{1.5}[SiO_3(OH)] \cdot 0.5(Mn(OH)_2)$ | Poldervaarite |
| $NaCa[SiO_3(OH)]$ | |
| $Ca_3[SiO_3(OH)]_2 \cdot 2H_2O$ | Afwillite |
| $Ca_3[SiO_3(OH)]_2 \cdot 2H_2O \cdot CaF_2$ | Bulfonteinite |
| $MnCaO[(SiO_3(OH)]$ | Mozartite |
| $Ca_3[Si_3O_8(OH)_2]$ | Rosenhahnite |
| $Ca_2[Si_2O_5(OH)_2] \cdot H_2O$ | Suolunite |

According to step (b), the inventive monophase hydraulic binder finally develops by grinding the calcium hydroxosilicate, preferably under heightened shearing and pressure effects, for example in a disk vibration mill, a ball mill or a roller mill. The hydrogen bonds are reorganized by the grinding and partly or completely destroyed by removing molecular water. The change of the hydrogen bonds and the conversion into molecular water can be detected by vibration spectroscopy.

Finally, if necessary, the $H_2O$ content (water content) of the monophase hydraulic binder is set to a value of 3.5% by weight to 20% by weight during step (c). For this purpose, first the proportion of the binder bonded in oxygen/hydrogen bonds is determined as $H_2O$ content. As long as the $H_2O$ content of the binder is more than 20% by weight, the adjustment is made by drying.

A mixture containing the inventive silicate hydraulic binder is also manufactured in analogy thereto in a two-step method.

In a first step (a') a mixture of silicate-containing raw materials and calcium-containing raw materials containing silicon, calcium, oxygen and hydrogen atoms is provided with or without water and converted into a preproduct which in part contains calcium hydroxosilicate having silanol groups.

$CaO$, $CaCO_3$ or $Ca(OH)_2$ are particularly suitable as calcium-containing raw materials. As silicon-containing raw materials quartz, silica, mica, feldspars, glasses or slags will primarily be considered.

In a particular embodiment a single starting material which already contains all required elements or may optionally be set accordingly by additives is used for step (a'). For this purpose, old concretes containing silicate-containing and calcium-containing raw materials are particularly suitable.

Subsequently thereto, according to (b') the preproduct will be ground until the monophase hydraulic binder forms from the calcium hydroxosilicate.

In a particular embodiment the inventive hydraulic binder shows a substitution at various positions in the solid state. The elements contributing thereto are already contained in the starting material or get into the manufacturing process by admixtures to the starting material.

The binder contains silicate building units having silanol groups which on the one hand are kept in a storable condition due to the specific composition and the processing and on the other hand react hydraulically when the binder is mixed with water and lead to setting, i.e. solidification. Along with the processing parameters, the type and composition of the mixture from the starting materials determine the exact composition, structure and hydraulic reactivity of the binder.

Products of a hydrothermal synthesis performed in step (a) and (a'), respectively, or in a mechanochemical synthesis, optionally in combination with a hydrothermal sequential process, are suitable as synthetic starting materials for step (b) and (b'), respectively.

If step (a) and (a'), respectively, is carried out hydrothermally in a pressurized autoclave at 140° C. to 300° C., calcium-containing raw materials such as CaO, $CaCO_3$ or $Ca(OH)_2$ and silicon-containing raw materials such as quartz, silica, mica, feldspars, old concretes, glasses or slags as well as optional further reaction partners will be directly reacted with water or water vapour in a pressurized autoclave. It is possible to add a lye, preferably NaOH or KOH. The lye adjusts the pH value to between 11 and 13, increases the reaction speed and permits the use of slowly reacting silicon compounds as raw material.

If step (a) and (a'), respectively, is carried out by mechanochemical manufacture, calcium-containing raw materials such as CaO, $CaCO_3$ or $Ca(OH)_2$ and silicon-containing raw materials will be ground in a mill, again with the option of adding a lye. In unreactive systems, such as, for example in CaO with quartz sand, it will then be necessary to continue with the above-described hydrothermal treatment step.

In another embodiment it is possible to manufacture composite binders by using blast-furnace slag, fly ashes, natural pozzolanas or conventional (Portland) cement. The latter is of particular interest if the inventive cement reacts very quickly (reaction control) or if the mixture of the starting materials contains more calcium than required.

Hydration products made from an inventive hydraulic binder contain calcium silicate hydrates having a low molar ratio of Ca:Si and thus are chemically more stable than C—S—H gels in Portland cement stone because no portlandite is formed and the silicate building units have a higher connectedness as compared to Portland cement stone. Furthermore, no weathering-sensitive portlandite is present at the contact points of the binder to the aggregate in mortars or concretes so that no weakened points form in the join of mortars and concretes.

If the inventive binder contains less than 1% of $Na_2O$ the binder framework made therefrom is less sensitive to secondarily occurring alkali silica reactions so that alkali-sensitive loadings may be used.

Below the invention will be explained in more detail by relating to embodiments.

EXAMPLE 1

Calcium Hydrogen Silicate as Starting Material

Calcium hydrogen silicate $\alpha$-$C_2SH$ was hydrothermally manufactured according to DE 10 2005 037 771 A1 from starting materials such as quartz, sand, limestone, old concrete, glass or slags at a temperature of 140° C. to 220° C. with seed crystals and with or without addition of NaOH (pH 11-13). The treatment period was between 6 hours and 3 days. The hydraulic binder was produced from the preproduct $\alpha$-$C_2SH$ by grinding, as described in the following two variants. The system of hydrogen bonds was destroyed in this process and water was partially removed. Contrary to DE 10 2005 037 771 A1 a partial dehydration was made at most; a complete dehydration leading to the conversion into a phase similar to $Ca_2SiO_4$ is not necessary.

EXAMPLE 1.1

Synthesis of Pure $\alpha$-$C_2SH$ and Conversion into the Inventive Hydraulic Binder by Grinding The hydrothermal synthesis of $\alpha$-$C_2SH$ from the starting materials sand, portlandite, $H_2O$ and NaOH (molar ratio of Ca:Si=2.0) was made by seeding with seed crystals from α-C₂SH at 200° C. for 72 hours with washing in H₂O/ethanol and subsequent drying at 100° C. for 24 hours. During grinding in a disk vibration mill for 60 to 300 seconds the preproduct was converted into the inventive binder with partial dehydration and restructuring of the OH groups.

This effect can be detected and tracked with IR spectroscopy: When the grinding period increases, the intensity of the lines $\nu_1$ OH(Ca) at 3540 cm$^{-1}$ and $\delta$ OH(Si) at 1270 cm$^{-1}$ decreases while a broad absorption band developing in the range of 3200 to 3500 cm$^{-1}$ can be allocated to the $\nu_1$ OH vibration. Other bands, which also can be traced back to OH vibrations, namely at 678 cm$^{-1}$ and 713 cm$^{-1}$ (both $\gamma_L$ OH), and at 747 cm$^{-1}$ and 754 cm$^{-1}$ (both $\nu_1$ Si—O(H)) are affected by the grinding process. Finally, the two bands $\gamma_1$ OH(O) at 2450 cm$^{-1}$ and 2840 cm$^{-1}$ typical of stretching vibrations of OH groups in hydrogen bonds change as a function of the grinding period. Both bands decrease in intensity, they become asymmetric and shift towards higher wave numbers to 2470 and 2930 cm$^{-1}$, respectively, which indicates the development of new, elongated hydrogen bonds.

The inventive binder is X-ray amorphous and appears in the X-ray powder diffractogram only through a increased baseline in the range of 0.4 nm to 0.23 nm superimposed by very weak reflections of α-C₂SH.

The restructured OH groups are freely available for another reaction with water. In the hydraulic reaction of the binder this reaction led to a polycondensation of the [SiO₃(OH)] units, i.e. to the formation of C—S—H phases and the development of strength. At a ratio of water to binder of 0.3 and by adding three parts of sand to one part of binder a compressive strength of 20 N/mm² was exceeded after 28 days.

The development of heat during the hydration was followed by means of a thermal-conductivity calorimeter. For this purpose, the binder was hydrated by adding water (mass ratio of water:binder=1.0). In the first few seconds after the proportioning of (mixing) water the release of heat of wetting was observed. After a period of very little net heat release (so-called dormatory period) the actual hydration process began. During this process the net heat release increased exponentially at first, then in a diminishing manner until it reached its maximum after 12 hours. In the following 5 to 10 hours it first decreased progressively, then in a diminishing manner, until it finally approached the zero line asymptotically.

The formation of C—S—H phases was detected by means of powder X-ray diffraction: A broad scattering appeared in the range of 2.0 nm to 1.0 nm (basal reflection), as did typical broad reflections at 0.31 nm, at 0.28 nm and at 0.18 nm.

EXAMPLE 1.2

Manufacture of Al-Substituted and Sulphur-Substituted Calcium Hydroxosilicate and Conversion into the Inventive Hydraulic Binder The starting materials sand, portlandite, Al(OH)₃, CaSO₄·0.5H₂O, H₂O, 1M-NaOH (the molar ratios were CaO: [SiO₂+Al₂O₃+SO₃]=2.0; SiO₂: [Al₂O₃+SO₃ₕ]=7; Al₂O₃: SO₃=1) were mixed with seed crystals from α-C₂SH and subjected to a hydrothermal treatment for 72 hours at 200° C.

The manufactured calcium hydroxosilicate has the composition of Ca₂[H Al₀.₀₈S₀.₀₄Si₀.₈₈O₄](OH), that means, the elements aluminum and phosphorous are incorporated in the structure of α-dicalcium silicate hydrate Ca₂[HSiO₄](OH). The incorporation into the structure takes place at tetrahedral positions and lowers the symmetry from orthorhombic to monoclinic, which was detected by splitting of reflections in the powder diffractogram. In IR spectra of Al-substituted and S-substituted α-C₂SH monocrystals a shift of the antisymmetric Si—O stretching vibration from 974 cm$^{-1}$ to 980 cm$^{-1}$ was found. A further consequence of the substitution is a change of the frequency of the double bands for the γ-OH vibrations from 929 cm$^{-1}$ to 940 cm$^{-1}$ and from 955 cm$^{-1}$ to 947 cm$^{-1}$, respectively. Further, in a comparison of pure to substituted α-C₂SH phases differences in intensity were found, in particular with the bands to which hydrogen contributes. Point defects occur on an atomic level. The point defects result in small angle boundaries, twinnings and domain structures, which were confirmed by means of TEM (transmission electron microscopy).

After washing the calcium hydroxosilicate with H₂O and ethanol and drying at 100° C. for 24 hours, the grinding was performed in the disk vibration mill for 60 seconds.

After the binder manufactured according to the invention in this manner had been mixed with water, the hydration and strength development proceeded clearly faster than in Example 1.1. The maximum of the hydration heat was reached after 10 hours. At a mass ratio of water to binder of 0.3 and by adding three parts of sand to one part of binder a compressive strength of 20 N/mm² was exceeded after 28 days. Aluminum and sulphur in the calcium hydroxosilicate Ca$_t$ [HAl₀.₀₈S₀.₀₄Si₀.₈₈O₄](OH) manufactured according to the invention facilitate the reaction to the inventive binder and represent reaction centers to the later hydration of the binder, which control the speed of the reaction with water. In this manner, it is therefore possible to speed up the hydration process.

EXAMPLE 1.3

Shortened Hydrothermal Treatment

The hydrothermal synthesis of a preproduct from the starting materials sand, portlandite, H₂O and NaOH (molar ratio of Ca:Si=2.0) was carried out by adding seed crystals from α-C₂SH at 190° C. for 6 hours. The resulting aqueous slurry was filtered off and subsequently dried for 48 hours at 70° C.

Due to the short hydrothermal treatment the preproduct was an inhomogeneous mixture of calcium hydroxosilicate and further constituents. The main constituents of this mixture were α-C₂SH, jaffeite (Ca₆[Si₂O₇](OH)₆) and an amorphous share. Portlandite, calcite and quartz appear as secondary constituents.

In a further step the preproduct was mixed with sand in a mass ratio of 1:1 and ground in a disk vibration mill for 360 seconds (inventive mixture 1) and 720 seconds (inventive mixture 2), respectively.

Table 2 shows the constituents of the two inventive mixtures containing an amorphous monophase hydraulic binder, which were determined by a quantitative Rietveld analysis and an internal standard.

TABLE 2

| constituent | inventive mixture 1 | inventive mixture 2 |
|---|---|---|
| α-C₂SH | 12.9% by weight | 12.0% by weight |
| Jaffeit | 13.0% by weight | 10.4% by weight |
| Portlandite | not detectable | not detectable |
| Calcite | 0.2% by weight | 0.3% by weight |
| Quartz | 47.7% by weight | 49.0% by weight |
| Amorphous monophase hydraulic binder | 26.2% by weight | 28.3% by weight |

The calcium hydroxosilicate was only partly reacted to the inventive binder. This phenomenon was also proven by means of IR spectroscopy by a reduction of the intensity of the bands typical of α-$C_2SH$.

Apart from a change of the grain sizes the grinding process particularly effected a reaction between the starting materials, which resulted in the inventive hydraulic binder. The BET surface of the preproduct was 30 $m^2/g$ and that of the quartz was 2 $m^2/g$, while the mill products had values of 6.6 $m^2/g$ (inventive mixture 1) and 5.8 $m^2/g$ (inventive mixture 2).

When water was added, the inventive mixtures 1 and 2 reacted hydraulically, formed C—S—H phases and developed strength. The formation of C—S—H phases was detected by means of powder X-ray diffraction through the development of a broad scattering in the range of 2 nm to 1 nm (basal reflection) as well as broad reflections at 0.31 nm, 0.28 nm and 0.18 nm. The formation of C—S—H was also detected in the IR spectrum of the hydrated products.

Studies by using conductivity calorimeters showed that in total a shorter grinding period led to lesser net release of heat. The maximum of the heat release was clearly lowered and the time until the maximum was reached was shortened.

EXAMPLE 2

Sodium Calcium Hydrogen Silicate as Starting Material

Quartz sand ($SiO_2$), $CaCO_3$, water and NaOH pellets (molar ratio of Ca:Si=1.0) served as starting materials.

The starting substances quartz sand and $CaCO_3$ were ground together or separately to achieve a good intermixing and small grain sizes (smaller than 25 μm) for the reaction. Then NaOH and water were added and the total amount was hydrothermally treated at 220° C. in steelcased Teflon autoclaves for 87 hours. After this hydrothermal treatment filtration was made, the product separated from the solution and NaOH was recovered. After that, adhering NaOH as well as excess $Na_2CO_3$ were separated off by washing with water or ethanol. The resulting intermediate product almost completely consists of $NaCa[HSiO_4]$, as shown by the powder diffractogram.

Intense washing with water may replace a part of the sodium in $NaCa[HSiO_4]$ by hydrogen. The resulting product will then have the composition of $Na_{(1-x)}Ca[H_{(1+x)}SiO_4]$ with x=[0, . . . , 1]. 30 g of $NaCa[HSiO_4]$ were each washed with increasing amounts of water (300, 1000, 3000 and 5000 ml, respectively). The substitution of hydrogen for sodium is indicated by increasing differences in the IR spectra. A broad band develops at approximately 1300 $cm^{-1}$, which proves additional OH groups, i.e. δ-OH(Si) at the Si tetrahedra. Moreover, some of the bands change in the range of 750 to 1000 $cm^{-1}$ (Si—O stretching vibrations). During the course of washing the two bands at 865 and 930 $cm^{-1}$, which initially have about the same intensity, pass over into a strong band at 942 $cm^{-1}$.

In the second step for manufacturing the inventive binder various preproducts of the composition of $Na_{(1-x)}Ca[H_{(1+x)}SiO_4]$ with x=[0, . . . , 1] were converted into an inventive monophase hydraulic binder by grinding in a disk vibration mill for 120 seconds. The grinding process causes a partial dehydration and restructuring of the OH groups. As a function of the grinding period the band at 1397 $cm^{-1}$ (δ-OH(Si)) loses intensity. The same fate happens to the broad bands at 2435 $cm^{-1}$ and 2820 $cm^{-1}$ (stretching vibrations of OH groups contributing to hydrogen bonds ($v_1$ OH(O)). The bands become smaller, more asymmetric and shift towards higher wave numbers, which proves a new system of hydrogen bonds. Thus the structure of the preproduct is destroyed. The newly developed inventive hydraulic binder is X-ray amorphous and a monophase.

The binder was hydrated by adding water (mass ratio of water:binder=1.0). In the first few seconds after the proportioning of (mixing) water the release of heat of wetting was observed. After a period of very little net heat release (so-called dormatory period) the actual hydration process started already after a few minutes up to a few hours, the maximum occurring earlier than in the examples low in sodium. At a mass ratio of water to binder of 0.3 and by adding three parts of sand to one part of binder a compressive strength of 20 $N/mm^2$ was exceeded after 28 days.

We claim:

1. A monophase hydraulic binder containing silicon, calcium, oxygen and hydrogen atoms in an arrangement comprising silicate building units having an average connectedness of smaller than or equal to $Q^{1.5}$ and silanol groups, with none or a part of the calcium atoms being substituted for by a metal atom $M[6]^{x+}$ sixfold or higher coordinated with oxygen and/or none or a part of the silicon atoms being substituted for by a metal atom $M[4]^{y+}$ tetrahedrally coordinated with oxygen, the molar ratio of $$[CaO+(x/2)\cdot(M[6]^{x+}O_{x/2})]:[SiO_2+M[4]^{y+}O_{y/2}]$$

having a value of 0.75 to 2.75 and the binder containing 3.5% to 20% by weight of $H_2O$.

2. The monophase hydraulic binder of claim 1, said molar ratio of $$[CaO+(x/2)\cdot(M[6]^{x+}O_{x/2})]:[SiO_2+M[4]^{y+}O_{y/2}]$$

having a value of 1.0 to 2.0.

3. The monophase hydraulic binder of claim 1, with a part of the calcium atoms being substituted for by Na, K, Li, Mg, Sr, Ba, Mn, Fe[+II] or Al[+III] atoms.

4. The monophase hydraulic binder of any one of claim 1, with a part of the silicon atoms being substituted for by Al, Ge, B, P, Fe, Be or Ti atoms.

5. The monophase hydraulic binder of claim 1 which reacts to hydrates after adding water, wherein more than 50% by weight of the hydrates are calcium silicate hydrates having a molar ratio of $$[CaO+(x/2)\cdot(M[6]^{x+}O_{x/2})]:[SiO_2+M[4]^{y+}O_{y/2}]$$

of smaller than 1.5.

6. A mixture containing a monophase hydraulic binder of claim 1.

7. The mixture of claim 6, containing at least 10% by weight of the monophase hydraulic binder.

8. A method for manufacturing a monophase hydraulic binder of claim 1, comprising the steps of:
 (a) Providing a mixture of solid materials containing silicon, calcium, oxygen and hydrogen atoms and converting this mixture into a calcium hydroxosilicate comprising silanol groups,
 (b) grinding the calcium hydroxosilicate until the monophase hydraulic binder forms, and
 (c) drying the monophase hydraulic binder to an $H_2O$ content of 3.5% by weight to 20% by weight as long as the $H_2O$ content is above 20% by weight.

9. The method for manufacturing a mixture according to claim 6, comprising the steps of:
 (a') Providing a mixture of silicate-containing raw materials and calcium-containing raw materials containing silicon, calcium, oxygen and hydrogen atoms and converting this mixture into a preproduct which in part contains a calcium hydroxosilicate comprising silanol groups, (b') grinding the preproduct until the monophase hydraulic binder forms from the calcium hydroxosilicate, and (c') drying the mixture containing the formed monophase hydraulic binder to a content of $H_2O$ of the monophase hydraulic binder of 3.5% by weight to 20% by weight as long as the $H_2O$ content thereof is above 20% by weight.

10. The method of claim 9, wherein quartz, silica, mica, feldspars, glasses or slags as silicate-containing raw materials and CaO, $CaCO_3$ or $Ca(OH)_2$ as calcium-containing raw materials or old concretes containing silicate-containing as well as calcium-containing raw materials are provided for carrying out step (a').

11. The method of claim 8, wherein in step (a) or (a') a calcium hydroxosilicate with monomeric silicate building units having silanol groups is generated.

12. The method of claim 8, wherein during step (a) the solid starting materials or during step (a') the calcium-containing raw materials and the silicate-containing raw materials are reacted with water vapor at a temperature of 140° C. to 300° C.

13. The method of claim 8, wherein during the process so much lye is added that a pH value of 11 to 13 appears.

14. A building material, manufactured by setting the monophase hydraulic binder according to claim 1 or according to the mixture of claim 6 with water and subsequent hardening.

15. The building material of claim 14, containing alkali-sensitive additives.

* * * * *